United States Patent [19]
Burgess

[11] Patent Number: 5,938,981
[45] Date of Patent: Aug. 17, 1999

[54] WATER AERATOR AND CIRCULATION SYSTEM

[76] Inventor: Harry L. Burgess, 5400 Memorial Dr., No.511, Houston, Tex. 77007

[21] Appl. No.: 08/879,011

[22] Filed: Jun. 19, 1997

[51] Int. Cl.$^6$ ................................................ B01D 47/16
[52] U.S. Cl. .......................... 261/34.1; 261/93; 261/120; 261/121.1; 261/121.2; 119/263
[58] Field of Search .......................... 261/93, 120, 121.1, 261/121.2, 91, 34.1, 36.1, DIG. 75; 210/221.2, 169; 119/263, 226; 415/203, 7, 88

[56] References Cited

U.S. PATENT DOCUMENTS

| | | | |
|---|---|---|---|
| 4,512,724 | 4/1985 | Horvath | 417/319 |
| 4,829,698 | 5/1989 | McDonald. | |
| 4,955,992 | 9/1990 | Goodale et al. | 96/155 |
| 4,985,181 | 1/1991 | Strada et al. | 210/169 |
| 5,139,659 | 8/1992 | Scott. | |
| 5,213,718 | 5/1993 | Burgess. | |
| 5,231,789 | 8/1993 | Radmanovich | 43/57 |
| 5,275,762 | 1/1994 | Burgess. | |

*Primary Examiner*—Jay H. Woo
*Assistant Examiner*—Robert Hopkins
*Attorney, Agent, or Firm*—Patterson & Associates

[57] ABSTRACT

The present invention generally provides a system for maintaining aquatic life that require oxygenated water, such as fish, shrimp, other marine animals, microbial populations, plant life and combinations thereof. The system generally includes a container and a centrifugal pump adapted selectively operate in either an aerating mode to provide oxygen to the aquatic life or a pumping mode in which the water in the tank is replace with fresh water. The pump is designed to be self priming, thereby allowing a system that is substantially self regulating and operating without the necessity of electronic controls.

18 Claims, 3 Drawing Sheets

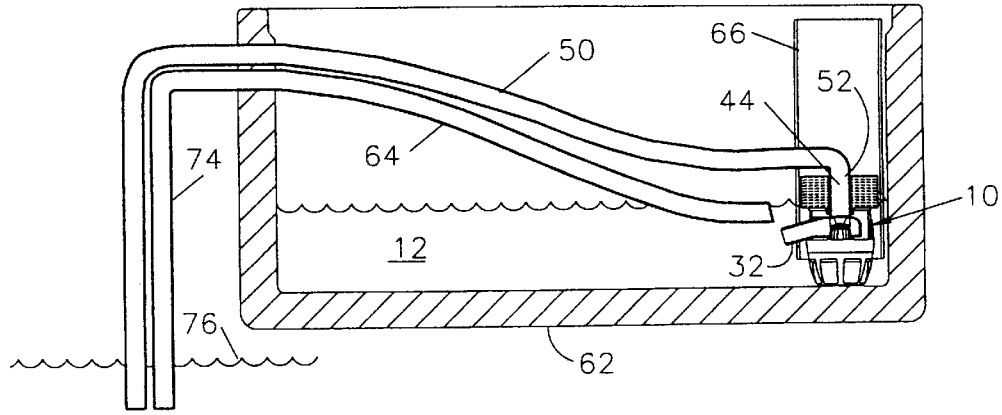
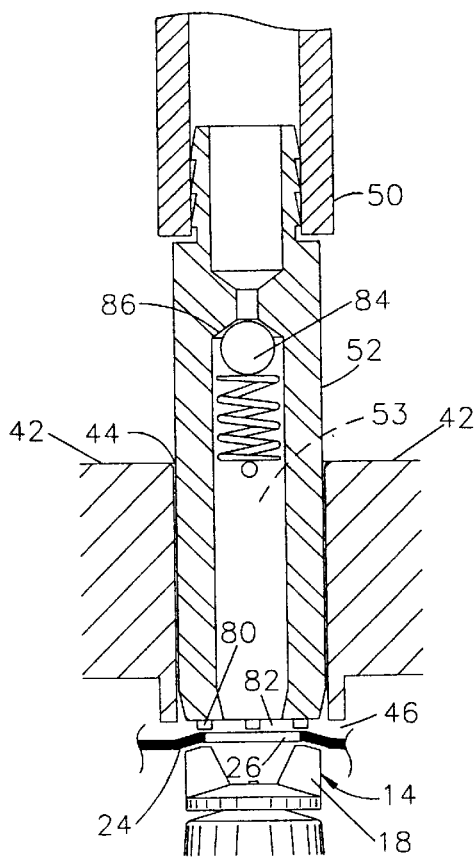
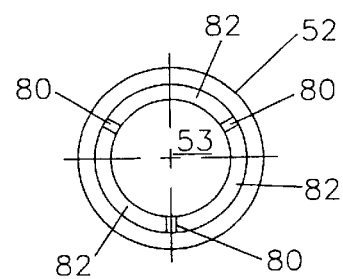
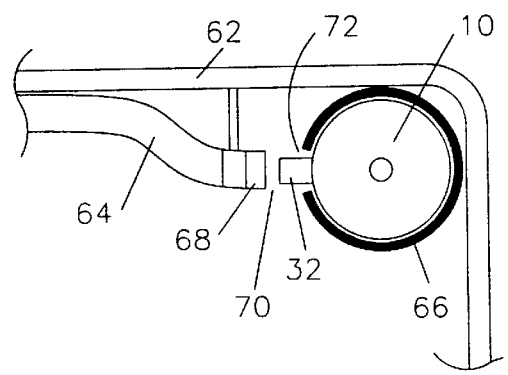

5,938,981

WATER AERATOR AND CIRCULATION SYSTEM

BACKGROUND OF THE INVENTION

1. Field of the Invention

The present invention relates to tanks and systems for containing and maintaining aquatic life. More particularly, the invention relates to systems for introducing fresh water, aerating the water and withdrawing used water with respect to a containment vessel or formation.

2. Background of the Related Art

It is often necessary or desirable to transport or maintain a small quantity of aquatic life in a small container. For example, the use of live bait, such as minnows or shrimp, for fishing requires that a container be used to transport a sufficient amount of bait for a day long fishing trip. It is preferred that the container provide sufficient aeration and fresh water for the bait during this period. Another example is the collection of live marine animals, such as crabs or shrimp, for personal consumption or resale to distributors or restaurants. It is most desirable to transport and maintain shrimp or other marine life in a container that provides sufficient oxygen and fresh water for the marine life to stay alive and well until just before consumption.

Over a short period of time such as one day, it is generally necessary to provide the marine life with a sufficient amount of aerated or oxygenated water. Typically, a container is filled with water and aerated with a device such as a bubble tube. When using a small fishing or shrimping boat, the container may take the form of a common cooler or refrigeration box comprising a plastic shell with a hinged lid. These coolers vary in size, but typically a water-filled cooler may be moved by one or two individuals from a boat to the dock and into a truck. Furthermore, in commercial shrimping or fishing operations, the container for storing marine life may be significantly larger and perhaps comprise a portion of the vessel's hull. Certainly, the capacity of the oxygenating device will vary in proportion to the size of the container and the population of marine life to be maintained.

If the population of marine life maintained in the container is high relative to the size of the container and the amount of water contained therein, then it is necessary to periodically replace the water with fresh water due to the increase in the concentration of waste products. The operation of removing and replacing the water may be accomplished through a number of methods. With small containers or coolers, this operation may include manually bailing water with a bucket or tipping the container over the side of the boat. Both of these methods, and other similar methods, are inefficient and require hard work. Furthermore, these methods involve a risk that some or all of the marine life will be swept from the container along with the water or otherwise lost during the operation.

In commercial applications, the exchange of water may be accomplished by using separate intake and outlet pumps to supply and discharge water, respectively. These two pumps may be provided in addition to one or more aerating devices. However, using intake and discharge pumps requires some means for turning the pumps on and off, such as manual switches requiring operator intervention or water level sensors which communicate with a controller that dictates operation of the pumps. However, having two pumps, an aerator and a control system increases the cost of the system and requires additional maintenance, not to mention more complex operation.

Therefore, there is a need for a system that will aerate water and replace the water periodically. Preferably, such a system should be simple and require little, if any, electronic controls. It would be desirable if the system could be adapted for use in any size of container, both personal or commercial. It would also be desirable if the system utilized less equipment and operated efficiently on standard electrical sources.

SUMMARY OF THE INVENTION

The present invention provides a system for maintaining an aquatic environment, comprising a water containment member having a centrifugal pump disposed within the water containment member, the pump having a pump inlet, a floatation member, a pump outlet, a water inlet tube selectively communicable with the pump inlet and a fresh water source, and an outlet tube selectively communicable with the pump outlet and a disposal region. The pump outlet can be manually aligned with the outlet tube briefly in order to initiate a syphoning of the water from the tank. Optionally, the system may further comprise a guide member coupled within the water containment member, wherein lowering the pump within the guide member provides alignment of the pump outlet with the first end of the outlet tube which is preferably secured in a spaced relation to the guide member in a lower portion of the containment member. It is preferred that a first end of the water inlet tube include a probe for engagement with the pump inlet. A particularly preferred probe comprises a seat which contacts the pump inlet and establishes an orifice therebetween to make the pump self priming. It may also be preferred that the probe include a check valve. The pump comprises a motor and either a built-in power pack or two electrical leads extendable beyond the water containment vessel for attachment with another power source.

Another aspect of the invention provides a method of maintaining aquatic life disposed in water contained in a tank, comprising the steps of: aerating the water with a floating centrifugal pump having an upwardly disposed pump inlet; submersing the pump inlet to pump water through a first tube and out of the tank; and communicating a fresh water source to the pump inlet through a second tube.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefor not to be considered limiting of its scope, for the invention may admit to other equally effective embodiments.

FIG. 5 is a partial cross-sectional view of the system of FIG. 3 with the pump in a water pumping mode with the pump in communication with a fresh water source for filling the tank.

FIG. 6 is a partial cross-sectional view of the probe coupled to the end of the water intake tube.

FIG. 7 is an end view of the probe showing the seats that contact the pump inlet and the orifice gaps therebetween.

FIG. 9 is a top schematic view of the pump guide member and the alignment of the pump outlet with the end of the water outlet tube.

DETAILED DESCRIPTION OF THE PREFERRED EMBODIMENT

Figure 1:
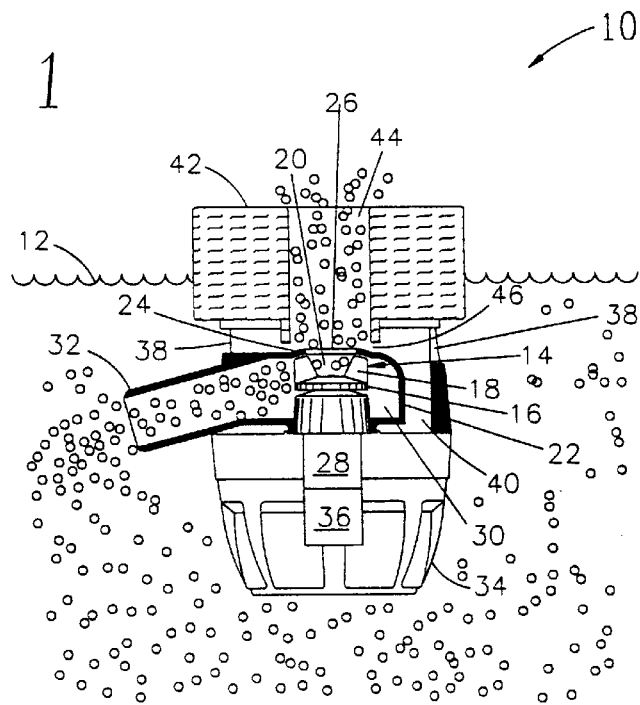
FIG. 1 is a cross-sectional view of a pump according to the present invention in an aerating mode.

The present invention provides a system for maintaining aquatic life that require oxygenated water, such as fish, shrimp, other marine animals, microbial populations, plant life and combinations thereof. The system generally includes a container, a pump for aerating water in the container and means for providing water to and from the container.

In one aspect of the invention, the pump is a centrifugal pump adapted for at least two operating modes. In an aerating mode, the pump casing maintains a disposition with the liquid inlet opening generally upward from a horizontal plane and capable of taking in liquid from a body of liquid in which the pump is disposed and also take a substantial amount of air or other gas from an area above that body of liquid to the pump's cavitation zone. Preferably, the pump thus takes in so much air that it surges, or is on the verge of surging. A pump which is adapted to operate in an aerating mode is described in U.S. Pat. No. 5,275,762 which is incorporated herein by reference for all purposes. In a water pumping mode, the liquid inlet to the pump is flooded or otherwise provided with sufficient water that the supply of air to the pump inlet is substantially cut off. Therefore, the pump draws water through it's inlet and discharges the water under pressure through an outlet opening.

The term "aerator", as used herein, is used to describe any device useful for aerating a fluid, where "aerating" means introducing air or any other gas into a liquid, such as water. Since a typical application of aerators is the introduction of air into water in a live bait container, the remainder of this description will refer to air and water for convenience, without limiting the scope of the invention.

Another aspect of the invention provides a self-priming pump system which can operate in either an aerating mode or a pumping mode. The pump system includes a pump having an inlet disposed upward in communication with a first source of water, preferably a body of water around the perimeter of the pump, and also in communication with either a source of oxygen, such as air, or a second source of water, preferably through a central pump inlet. The second source of water may be provided to the central pump inlet through a tube having a probe coupled to the end of the tube that may be easily coupled or uncoupled to the pump inlet. The probe includes a central passage through which fluid from the tube passes into the central pump inlet.

The probe may be inserted into the central pump inlet for evacuating air from the tube and pumping water through the tube. The probe has a perimeter or circumferential surface which fits snugly within the central pump inlet to form a loose water seal. The end of the probe that is inserted into the central pump inlet includes a seat which contacts the pump inlet and establishes an orifice through which water from the first water source enters the pump. In this manner, the pump inlet is allowed to communicate with both the first and second water sources. In one preferred embodiment, the orifice is about 0.035 inches in height around around a ½ inch diameter cylinder through which the air or water flows.

Yet another aspect of the invention provides a system comprising an aquatic tank and a single pump for aerating water, pumping water out of the tank and pumping water into the tank. Preferably, the tank includes a water outlet channel, such as a tube or pipe, communicating outside the tank and a water inlet channel, such as a tube or pipe, that may be placed in communication with a source of water. The preferred water inlet channel is adapted for selective communication with the pump inlet and the preferred water outlet channel is adapted for selective communication with the pump outlet. It should be recognized that the tank may be of any size or shape including a vessel or boat having a container or hull for storing aquatic life therein.

FIG. 1 is a cross-sectional view of a pump 10 according to the present invention in an aerating mode. The pump 10 is intended to float in a body of liquid 12 to be aerated, such as water, within a tank or other container (not shown). The "tank" may be any suitable container, such as an aquarium in which pet fish are kept, an ice chest or cooler in which live bait are taken while fishing, or any other suitable container. It will also be readily appreciated that the invention can be used to aerate or gasify any body of liquid 12, whether in a relatively small container such as just mentioned, or larger, e.g. a waste treatment pond, either man-made or natural.

The pump is a centrifugal pump including a hubbed, vaned, rotary impeller 14. Impeller 14 includes a disk-like bottom plate 16 and a plurality of blades 18 rigidly mounted on the upper surface of the plate 16. The blades 18, and the flow passages defined between them, extend generally radially from a central eye 20 defined inwardly of the radially inner ends of blades 18, which do not extend all the way in to the center line or axis of the impeller 10.

Figure 8:
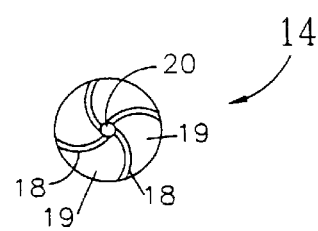
FIG. 8 is a top schematic view of the pump impeller.

Referring briefly to FIG. 8, the blades 18 and flow passages 19 are shown to curve radially and tangentially in a well-known manner. "Generally radial," as used herein, includes such conventional configurations; more specifically, the term means that if the direction in which such a blade or passage extends, at various points along its length, respectively, is broken down into radial and tangential components, the radial component will be at least half as large as the tangential component over major portion of the blade length.

The pump 10 also includes an impeller housing 22. It is important that the impeller housing 22 have an upper wall 24 that closely overlies a major portion of the blades 18 (i.e. at least half their length), that portion being disposed radially outermost. Since the impeller 14 has no upper plate or disk, but rather has flow passages 19 between the blades 18 opening upwardly, this closely overlying upper wall 24 of the housing 22 confines the fluid as it flows through the outer parts of the flow passages 19 between the blades 18.

However, upper wall 24 of the impeller housing 22 has a central, axially upwardly opening inlet 26 that lies over and exposes the eye 20 of the impeller and the innermost ends of the blades 18. Thus, the pump 10 floats in the tank substantially below the level of water 12 in the tank and in an inverted position from that in which such a pump is normally mounted. That is to say, the motor 28 (described below) is mounted so that a drive shaft and the impeller 14 extend above the motor 28 rather than extending below the motor as is usually the case, and the inlet 26 opens upwardly as shown.

Through the inlet 26, water enters in an axial direction and passes into the eye 20 and the innermost parts of the flow passages 19. When the impeller 14 is rotating relative to the housing 22, as will be described below, the water is accelerated by centrifugal force, its direction of flow changed from axial to radial as it is thrown outwardly through the flow passages 19 between the blades 18. Then, the fluid passes into a generally annular outlet plenum area 30 defined between the side walls of the impeller housing 22 and out through a single tubular outlet port or tube 32.

The motor 28 is preferably contained within walls 34 extending below the impeller 14 and housing 22. The motor 28 may receive electrical power from either an internal power source, such as a battery 36, or an external power source, such as the battery of a boat, through a set of wires (not shown). An internal, self-contained power source, such as a battery pack 36, may supply power to the motor 28 via well-known electrical connection means. A switch may be used to selectively complete or break the connection between the battery pack 36 and the motor 28, wherein the switch is preferably accessible from the outside of wall 34.

An upper portion of the wall 34 includes strainer holes 38 integrally formed therein. The strainer 38 allows the entry of water into a cavity 40, yet prevents the passage of large masses that could plug the pump.

The collar 42 attached to the housing may be formed of synthetic foam or other suitable buoyant material, and is adapted to be adequate to support the entire pump 10 in a floating position with the collar 42 bridging the exterior water level 12, as shown. The collar 42 forms an upstanding housing extension conduit with its central inlet passage 44 aligned with inlet 26. The inlet passage 44 is preferably wide as compared to inlet 26. By this is meant that passage 44 is about the same width as inlet 26, or even wider, as shown. This not only allows a virtually unlimited supply of air to the impeller 14, but also eliminates small and tight places near the top of the impeller, wherein any shrimp feelers or the like that might manage to bypass the strainer or splash over the top of the collar 64 might otherwise lodge.

It should be noted that the strainer holes 38 are taller than the upper impeller housing wall 24, and abuts the underside of collar 42, whereby the lower end of collar 42 is spaced above wall 24. Thus, an annular gap 46 is formed between the lower end of collar 42 and the wall 24. This annular gap 46 opens generally laterally and forms a limiting part of the flow path for water into the inlet 26. That is to say, the gap 46 is sized to provide less cumulative flow area than the only other arguable restriction or limiting point upstream of inlet 26, i.e. the strainer 38.

The slots or holes in the strainer 38 are more than adequate, in size and number, to provide enough cumulative flow area for liquid to satisfy the pump. However, gap 46 does not. Rather, and in contravention to conventional centrifugal pump practice, gap 46 is specifically designed to limit the flow of fluid to the pump, so that, if the pump is operating in its normal range of speeds, and at the depth range at which collar 42 will hold it, the gap 46 will not pass as much liquid per unit time as the pump can handle. Thus, the pump will take in air through the passage 44 of collar 42. Gap 46 is preferably made small enough so that the pump will continually vacillate between a primed condition and a non-primed condition.

These conditions cause a high degree of turbulence in the water flowing over wall 24 into inlet 26. Furthermore, due to the relatively small size of gap 46, the internal water level within passage 44 will be very low, much lower than the level 12 outside, so that the turbulent water passing over wall 24 will be in a relatively thin layer. Under ideal conditions, this layer of turbulent water corresponds in thickness to the height of gap 46. (If the gap 46 were large enough to allow the pump to be satisfied fully by water flow, the water level would rise higher in passage 44.) All of these factors cooperate to maximize the amount of air that is thereby entrained in the water as it enters and passes through the pump.

A pump according to the invention can be made by fairly simple modifications to an existing, commercially available pump. For example, a pump essentially of the type shown in FIG. 1 has been made from a V450 or V1250 pump, both available from Attwood of Lowell, Mich. Means for mounting the pump to a tank were removed, and a floatation collar 42 was added. The battery pack 36 was used as ballast, and the collar 42 appropriately sized with respect thereto, so that the pump would not only float with the pump inlet upwards at the desired depth, but would turn itself to that position if placed in the water in another position. The position of collar 42 with respect to housing wall 24 was empirically adjusted to provide the desired size gap 46 at which aeration was maximized. It will be understood that the rate of flow of water into the pump 10 is a function of a number of factors including the cross-sectional areas of the various passageways through which the water must flow, the speed at which the impeller is rotated, and the hydraulic head of water into the pump.

Adjustment of the pump 10 to obtain the desired performance may be done empirically. For example, the vertical spacing of the collar 42 from the wall 24 can be varied using annular shims of various sizes, until, by simply looking down through the center passage 44 while the impeller is rotating, one observes the low internal liquid level and turbulent action desired. Then, for a production model, the shims can be replaced by a suitably sized integral collar.

Figure 2:
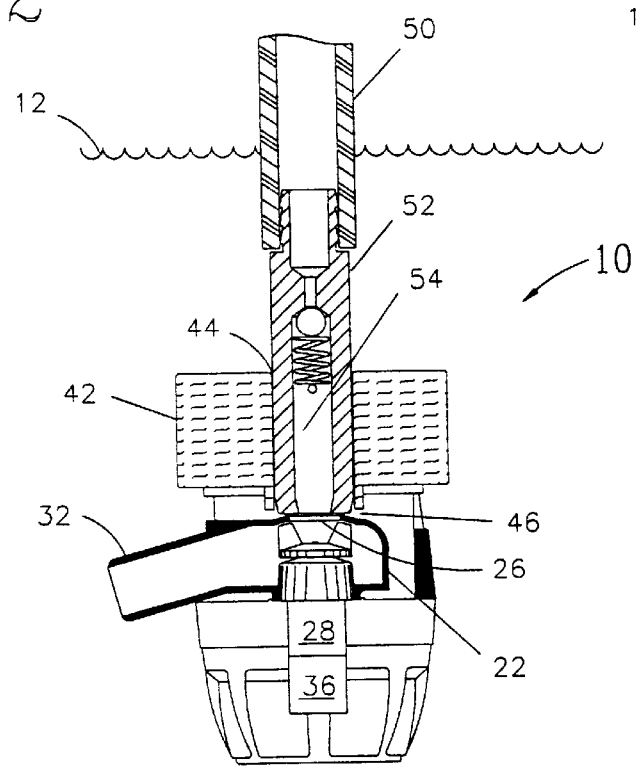
FIG. 2 is a cross-sectional view of the pump of FIG. 1 in a water pumping mode.

FIG. 2 is a cross-sectional view of the pump 10 of FIG. 1 in a water pumping mode. The pump 10 operates similarly in pumping mode as in the aerating mode, except that the passage 44 through the collar 42 is either flooded with water from the body of water 12 or coupled with another source of water, such as through a tube 50 and probe 52. In order to flood the passage 44, it is merely necessary to submerse the pump. Conversely, the passage 44 may be coupled to a another water source by inserting a tube and/or probe into the passage 44. In either case, the pump impeller 14 receives only water, i.e. through the gap 46 and either the passage 44 through the collar 42 or the central passage 54 of the probe 52. Without the introduction of air, the pump 10 is switched from an aerating mode to a pumping mode in which the impeller housing 22 is liquid full.

Figure 3:
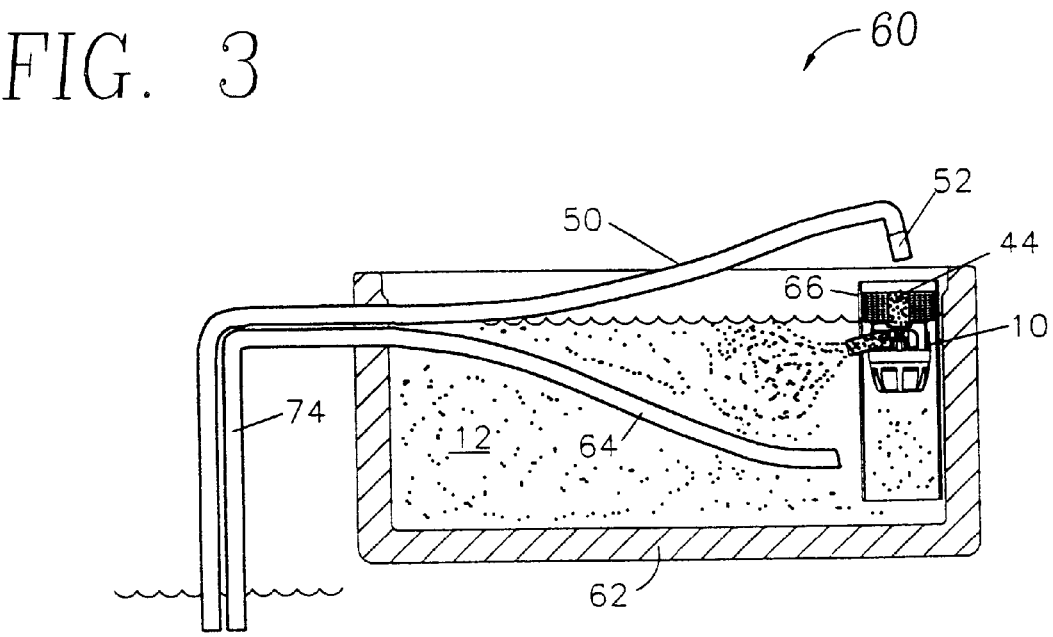
FIG. 3 is a partial cross-sectional view of a system according to the present invention with the pump in an aerating mode.

FIG. 3 is a partial cross-sectional view of a system 60 according to the present invention with the pump 10 in an aerating mode. The system 60 includes a tank 62 holding water 12, a water inlet tube 50 with probe 52, a water outlet tube 64 and an optional pump guide member 66. As previously mentioned, the tank 62 may be of virtually any size and configuration. The water inlet tube 50 is shown as a flexible tube or hose, but may be any flexible or rigid hose, pipe, conduit, channel or other fluid passage means that can be made to selectively communicate a water source to the passage 44 of the pump 10. The selective communication of the pump inlet with either air or water is shown in a simple, manual configuration, but the same or similar selective communication may be accomplished with valve arrangements or automated components in electronic communication with a controller. The present embodiment shown in FIG. 3 is generally preferred, however, for small containers due to its simplicity and flexibility of operation, low maintenance and low cost.

Figure 4:
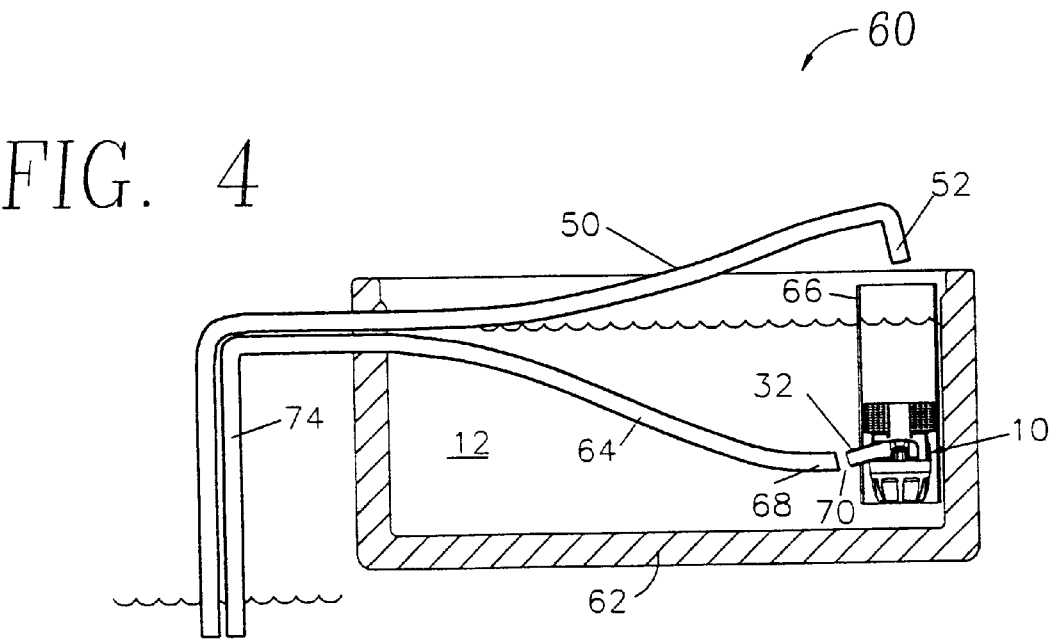
FIG. 4 is a partial cross-sectional view of the system of FIG. 3 with the pump in a water pumping mode and at an elevation to initiate emptying of the tank.

FIG. 4 is a partial cross-sectional view of the system of FIG. 3 with the pump in a water pumping mode (as earlier described in relation to FIG. 2) and at an elevation to initiate emptying of the tank 62. The tank 62 is emptied by submersing the pump 10, causing the pump to enter a pumping mode, and aligning the pump outlet tube 32 with the inlet end 68 of the water outlet tube 64. The alignment of the pump outlet tube 32 and the outlet tube 64 can be accomplished with or without a pump guide member 66, as shown. When using a pump guide, the inlet end 68 is preferably secured in a position that is predetermined relative to the pump guide member 66 in order for alignment with the pump outlet tube 32 to be easily accomplished simply by pushing the pump 10 downward through the guide member 66. During alignment, the inlet end 68 and the outlet tube 32 will have only a short gap 70 therebetween, typically between about 1/16 and about 1/4 inch.

Referring briefly to FIG. 9, a top view of the pump guide 66 is shown with the pump 10 positioned therein and the pump outlet 32 disposed through a vertical slot 72 in the guide 66 so that the radial alignment of the pump outlet 32 is maintained to align with the inlet end 68 of the water outlet tube 64 whenever the pump 10 is submersed to the correct depth. The correct depth for alignment must only be maintained momentarily to establish a syphon. Because the portion of the tube 64 under the water 12 will be full of water, the pump 10 need only push sufficient water through the tube 64 so that a column of water fills the downward extending portion 74 to a point below the elevation of the inlet end 68. Such a column of water will syphon water from the tank until the syphon is broken by introducing air into the tube. Note that it is not necessary to maintain alignment of the pump outlet 32 with the inlet end 68 after syphoning has begun. Again, It is noted that the pump guide member 66 is optional and that the requisite alignment may be obtained without the guide by grasping both the tube and the pump and holding them in alignment for a brief moment.

FIG. 5 is a partial cross-sectional view of the system 60 of FIG. 3 with the pump 10 in a water pumping mode (as described earlier in reference to FIG. 2) with the pump inlet 26 in communication with a fresh water source 76 for filling the tank 62. The fresh water source 76 is communicated to the pump inlet 26 through the water inlet tube 50 and probe 52 which is inserted into the passage 44. It should be recognized that the tank 62 may be filled through tube 50 either simultaneous with or subsequent to emptying of the tank 62 through tube 64. If the tank is filled simultaneous with emptying, then a certain amount of fresh water will flow through the tank and the rate at which the water level drops will be a function of the degree to which the syphon rate exceeds the filling rate. Once the water level drops sufficiently to break the syphon, the pump will already be in a pumping mode which will refill the tank. Alternatively, the tank may be partially or fully emptied before initiating fresh water into the pump by inserting the probe 52 into the passage 44. In this manner, the used or contaminated water will be emptied without dilution with fresh water.

FIG. 6 is a partial cross-sectional view of the probe 52 coupled to the end of the water intake tube 50 and inserted into the pump passage 44 to communicate with the pump inlet 26. It is of great advantage, in accordance with the present invention, that the probe 52 include seats 80 which establish an opening or orifice 82 therebetween through which water from the gap 46 can still enter the pump inlet 26. In this manner, the pump 10 is self-priming even when the tubing 50 is initially full of air. The orifice 82 is sized appropriately to allow sufficient water into the pump inlet 26 so that the pump 10 will prime and pull a gulp of air through the pump before loosing prime. The pump then primes again and again, until all the air in the tubing 50 has been evacuated. Once the tubing 50 is water full, the pump remains primed throughout the pumping mode. In order to avoid repetitively evacuating air from the tube 50, a check valve, such as a spring loaded ball 84 and seat 86, may be provided within the probe 52. FIG. 7 is an end view of the probe 52 showing the seats 80 that contact the pump inlet plate 24 and the orifice gaps 82 therebetween.

Referring again to FIG. 5, it should be recognized that as the tank 62 is refilled with water, the water level rises. Once a desired water level is achieved, the probe 52 should be removed from the passage 44. The buoyant pump 10 will again rise to float along the surface of the water as in FIG. 1 and return from a pumping mode to an aerating mode. No special maintenance or reinitiation procedures are necessary, although it may be desirable to close the lid, if any.

In operation, the tubes 50 and 64 will typically be hung over the side of a boat so that the water around the boat serves both as the source of fresh water and as a disposal for the used water. It may be beneficial or desirable in some applications, to leave the tubes hanging or secured over the rear wall of the boat with the ends at such an elevation that the end will be above the water level when the boat is moving at significant speeds, but will be submersed when the boat is stopped or at very low speeds.

While it is generally preferred that the pump include floatation means, other means for allowing both water and air to enter the pump inlet are envisioned. For example, the pump may be secured by a clip along the surface of the water during the aerating mode, particularly in applications where the water level is controlled, and submersed during the pumping mode. Alternatively, it is anticipated that both the aerating mode and the pumping mode could be accomplished with a stationary pump so long as provision is made for selectively delivering air to the pump inlet and aligning the pump outlet with the water outlet tube.

Again it is anticipated that any or all aspects of the present invention could be automated. For example, a full tank could be detected by a water level sensor disposed at a desired position in the tank in order to interrupt the water flow into the tank, perhaps by a three-way valve which provides selective communication of water or air into the pump. This and other monitoring and control assemblies will be apparent to those skilled in the art and are believed to be within the scope of the present invention.

While the foregoing is directed to the preferred embodiment of the present invention, other and further embodiments of the invention may be devised without departing from the basic scope thereof. The scope of the invention is determined by the claims which follow.

What is claimed is:

1. A system for maintaining an aquatic environment, comprising:
   (a) a water containment member;
   (b) a centrifugal pump disposed within the water containment member, the pump having a pump inlet directed generally upward from a horizontal plane and a pump outlet;
   (c) a water inlet channel selectively communicable with the pump inlet and a water source; and
   (d) an outlet channel communicable with the pump outlet, the pump being adapted to aerate water in a first mode where the pump inlet is at least partially open to a gas source and the pump inlet is at least partially open to a water source and the pump being adapted to flow water in a second mode to raise or lower a water level in the water containment member.

2. The system of claim 1, wherein the pump is self priming.

3. The system of claim 1, wherein the water inlet channel has a first end coupled to a probe for engagement with the pump inlet.

4. The system of claim 3, wherein the probe comprises a seat which contacts the pump inlet and establishes an orifice therebetween.

5. The system of claim 4, wherein the probe further comprises a check valve.

6. The system of claim 1, wherein the pump comprises a motor and built-in power pack.

7. The system of claim 1, wherein the pump comprises a motor and two electrical leads extendable beyond the water containment vessel.

8. The system of claim 1, further comprising a guide member disposed within the containment member, wherein the outlet channel has a first end secured in a spaced relation to the guide member in a lower portion of the containment member, wherein lowering the pump within the guide member provides alignment of the pump outlet with the first end of the outlet channel.

9. The system of claim 1, wherein the pump inlet is partially restricted by an orifice to alter the mixture of gas and water pumped by the pump in the first mode.

10. The system of claim 1, wherein the pump is adapted to create a siphon on at least one of the channels by being positioned at least in proximity to the channel to start the water flow in the second mode.

11. The system of claim 10, wherein the system is adapted to allow the water to continue flowing after removal of the pump from the proximity of the channel.

12. The system of claim 1, wherein the pump inlet extends through a float.

13. A system for aerating and pumping a liquid, comprising:

a centrifugal pump having an inlet that is directed generally upward from a horizontal plane, a liquid passage in fluid communication with the inlet and a second passage in fluid communication with the inlet, wherein the second passage is selectively engageable with a source of gas or a source of liquid, the pump being adapted to aerate water in a first mode where the pump inlet is at least partially open to the gas source and the pump inlet is at least partially open to the liquid source and the pump being adapted to flow liquid in a second mode to raise or lower a liquid level in a liquid containment member.

14. A method of maintaining aquatic life disposed in water contained in a water containment member by aerating and pumping water in the water containment member, comprising:

(a) allowing a pump inlet of a floating centrifugal pump having an upwardly disposed pump inlet to communicate with a gas source and a water source in an aeration mode;

(b) aerating water in a water containment member with the mixture of gas and water;

(c) immersing the pump inlet of the centrifugal pump with water to pump water in a pump mode; and (d) adjusting a water level in the water containment member by operating the pump in a pump mode.

15. The method of claim 14, further comprising creating a siphon in at least one of a fluid inlet channel or outlet channel extending outside the water containment member with the centrifugal pump and flowing water through the channel.

16. The method of claim 15, further comprising discommunicating the centrifugal pump from the channel and allowing the water to continue to flow for a period of time.

17. The method of claim 15, wherein creating the siphon in the channel with the centrifugal pump comprises locating the pump at least in proximity to the channel and pumping through the channel.

18. The method of claim 14, further comprising discontinuing the immersing of the pump inlet, and further aerating the water.

* * * * *

UNITED STATES PATENT AND TRADEMARK OFFICE
CERTIFICATE OF CORRECTION

PATENT NO. : 5,938,981
DATED : August 17, 1999
INVENTOR(S) : Harry L. Burgess

It is certified that error appears in the above-indentified patent and that said Letters Patent is hereby corrected as shown below:

In column 4, line 32, please replace "10" with "14".

In column 5, line 35, please replace "64" with "42".

In column 7, line 19, after "guide", please insert "member".

In column 7, line 32, please replace "It" with "it".

Signed and Sealed this

Twentieth Day of March, 2001

Attest:

NICHOLAS P. GODICI

Attesting Officer     Acting Director of the United States Patent and Trademark Office